United States Patent
Sticksel et al.

(10) Patent No.: US 12,481,257 B2
(45) Date of Patent: Nov. 25, 2025

(54) WORK MACHINE AND METHOD FOR CALIBRATING AN ELECTROHYDRAULIC PUMP IN AN OPEN CENTER HYDRAULIC SYSTEM

(71) Applicant: Deere & Company, Moline, IL (US)

(72) Inventors: Justin Sticksel, Galena, IL (US); Aaron R. Kenkel, East Dubuque, IL (US); Jeffery Dobchuk, Saskatchewan (CA); Bryan J. Rausch, Durango, IA (US); Madeline T. Oglesby, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/459,706

(22) Filed: Sep. 1, 2023

(65) Prior Publication Data

US 2023/0407599 A1 Dec. 21, 2023

Related U.S. Application Data

(63) Continuation-in-part of application No. 17/651,920, filed on Feb. 22, 2022, now abandoned.

(51) Int. Cl.
*G05B 17/02* (2006.01)
*F15B 19/00* (2006.01)
*G05B 13/02* (2006.01)

(52) U.S. Cl.
CPC ............ *G05B 17/02* (2013.01); *F15B 19/002* (2013.01); *G05B 13/021* (2013.01);
(Continued)

(58) Field of Classification Search
CPC ........... F15B 19/002; F15B 2211/8646; G05B 13/021; G05B 17/02; G05B 2219/37604; G05B 2219/41246
See application file for complete search history.

(56) References Cited

U.S. PATENT DOCUMENTS 5,810,095 A 9/1998 Orbach et al.
6,058,343 A 5/2000 Orbach et al.
(Continued)

FOREIGN PATENT DOCUMENTS

DE 60101240 T2 9/2004
DE 60219120 T2 7/2007
(Continued)

OTHER PUBLICATIONS

German Search Report issued in application No. 102024120831.7 dated Mar. 25, 2025, 12 pages.

*Primary Examiner* — Matthew Wiblin

(57) ABSTRACT

A work machine and method for a work machine with an open center hydraulic system for controlling actuation of an implement includes an implement control valve, an electrohydraulically controlled pump, a hydraulic circuit coupled to the implement actuator, and a pressure transducer positioned for measuring a pressure in the hydraulic circuit between the pump and the implement control valve. A calibration system for calibrating the pump includes a controller having a non-transitory computer readable medium having a program instruction for causing a processor to calibrate a first pump threshold for the pump in a pump-flow curve wherein the first pump threshold including a minimum pump control signal to actuate the pump; determine a hysteresis band in the pump-flow curve; and calibrate a second pump threshold for the pump in the pump-flow curve wherein the second pump threshold including a maximum pump control signal to actuate the pump below a relief setpoint.

20 Claims, 10 Drawing Sheets

(52) U.S. Cl.
CPC .............. *F15B 2211/8646* (2013.01); *G05B 2219/37604* (2013.01); *G05B 2219/41246* (2013.01)

(56) References Cited

U.S. PATENT DOCUMENTS

| | | | |
|---|---|---|---|
| 6,615,114 B1 * | 9/2003 | Skiba | G01L 27/005 |
| | | | 73/1.01 |
| 6,965,822 B2 | 11/2005 | Brome et al. | |
| 9,163,644 B2 | 10/2015 | Peters et al. | |
| 9,279,736 B2 | 3/2016 | Hughes et al. | |
| 10,588,258 B2 | 3/2020 | Jung et al. | |
| 2021/0156373 A1 | 5/2021 | Shimamoto et al. | |
| 2021/0286332 A1 | 9/2021 | Dobchuk | |
| 2023/0265870 A1 | 8/2023 | Sticksel et al. | |

FOREIGN PATENT DOCUMENTS

| | | |
|---|---|---|
| DE | 102006011350 A1 | 9/2007 |
| DE | 102009019946 A1 | 12/2009 |
| DE | 112016000707 T5 | 8/2018 |
| DE | 102021208713 A1 | 2/2023 |
| DE | 102023100939 A1 | 8/2023 |
| WO | WO 2014007952 A2 | 1/2014 |

* cited by examiner

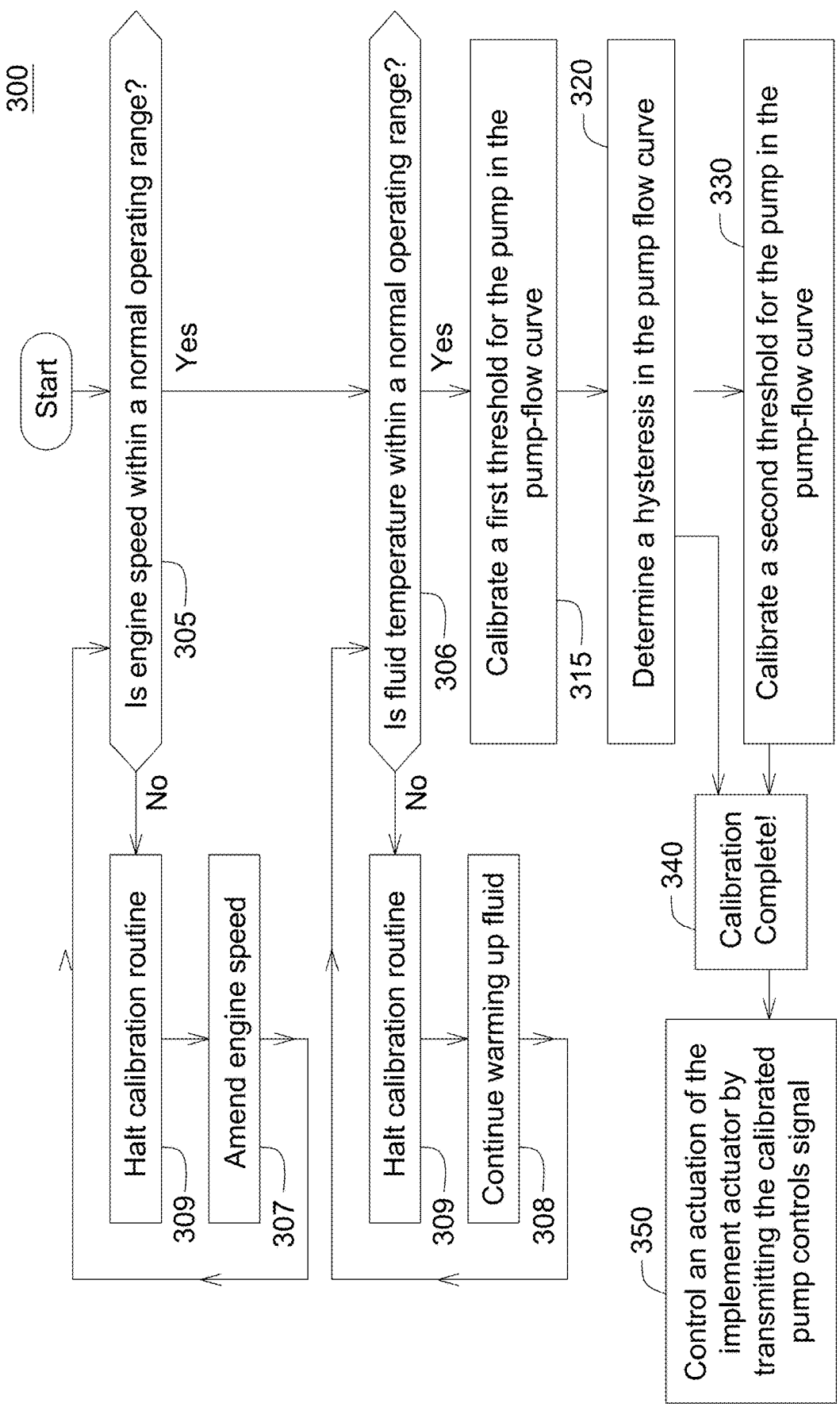

WORK MACHINE AND METHOD FOR CALIBRATING AN ELECTROHYDRAULIC PUMP IN AN OPEN CENTER HYDRAULIC SYSTEM

CROSS-REFERENCE TO RELATED APPLICATIONS

The present patent application is a continuation-in-part of U.S. patent application Ser. No. 17/651,920, "Work Machine and Method for Calibrating an Electrohydraulic Pump in an Open Center Hydraulic System", filed at the United States Patent and Trademark Office on Feb. 22, 2022; the contents of which is incorporated herein by reference.

FIELD OF THE DISCLOSURE

The present disclosure relates to a work machine and a method for calibrating an electrohydraulic pump in an open center hydraulic system.

BACKGROUND

In industrial or construction work machines, a system of hydraulic pumps, valves, and actuators are often used to produce motion for an implement. Various technologies exist to manage the control of these hydraulic devices. Systems can be developed that blend elements of each available technology. Some systems rely purely on hydro-mechanical means of controlling pumps, valves, and actuators (also commonly referred to as manual or pilot operated controls). Other systems, however, incorporate electronic devices for control (commonly known as electro-hydraulic controls). Electro-hydraulic devices can be utilized to control hydraulic pumps and valves. These devices can take on various design forms. One embodiment for an electro-hydraulic control device is the use of an electronic solenoid to induce electro-magnetic forces either directly or indirectly on a valve spool by subjecting the solenoid to a given electrical current. The actuation of the valve spool by the solenoid is used to induce a given hydraulic pressure, which may then be used to pilot a main stage valve spool or pump. This provides the ability to electronically control the flow or pressure in a hydraulic circuit, which is ideal for implementation in complex control systems that utilize microcontrollers. Depending on the application of electro-hydraulic devices in a given system, a method for calibrating components is often necessary to optimize system performance. A nominal input/output relationship for a device can be determined based on the component design. However, manufacturing tolerances may deviate the system from theoretical nominal performances from one component to the next. Calibration routines are often developed to account for such variances. Therein lies an opportunity to develop a calibration routine optimized to account for variances in pump performance in an open center hydraulic system.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure relates to a work machine with a calibration system, and method of calibrating the pump in an open center hydraulic system. The open center hydraulic system controls actuation of the implement. The open center hydraulic system includes an implement control valve configured to control a flow ratio of the fluid through the hydraulic circuit between a reservoir and an implement actuator in response to a valve control signal. The hydraulic system also includes an electro-hydraulically controlled pump for controlling an outlet flow of the fluid through the hydraulic circuit in response to a pump control signal. This hydraulic circuit is coupled to the implement actuator. A pressure transducer is positioned for measuring a flow pressure in the hydraulic circuit between the pump and the implement control valve. The calibration system calibrates the pump for controlling the fluid flow through the open center hydraulic system. The calibration system includes a controller having a non-transitory computer readable medium with program instructions to do the following steps. The program instructions calibrate a first pump threshold and second pump threshold in the pump-flow curve. A minimum pump control signal to actuate the pump is extrapolated from the first pump threshold. A maximum pump control signal to actuate the pump below a relief setpoint is extrapolated from the second pump threshold. The program instructions also include control of an actuation of the implement by transmitting the calibrated pump control signals to the electro-hydraulically controlled pump.

Calibrating the first pump threshold in the pump-flow curve may comprise of setting the pump at a constant flowrate, recording the flow pressure, and ramping the valve control signal by a pump calibration step point until the flow pressure changes a defined value. The defined flow pressure change value is indicative of the fluid flow restricted to the reservoir. Calibrating the first pump threshold also includes maintaining the valve control signal at the restriction setting, neutralizing the pump control signal, ramping the pump control signal by a pump calibration step point. The program instruction correlates a flow pressure change to the change in the pump control signal to identify a point on the pump-flow curve, and iteratively repeating the ramping the of the pump control signal until the flow pressure rises a target value.

The program instructions may further comprise determining a hysteresis band in the pump-flow curve. The program instructions include setting the valve control signal at the restriction setting from calibrating the first pump threshold, setting the pump control signal to full pump command, recording the flow pressure, and ramping the valve control signal down until the flow pressure drops a defined value. The program instructions for determining a hysteresis band further include correlating the flow pressure to the pump control signal to identify a point on the pump-flow curve, and iteratively repeating the ramping down of the pump control signal and correlating the flow pressure to the pump control signal until the pressure drops a second target value.

Calibrating the second pump threshold for the pump in the pump-flow curve may comprise of setting the adjusted valve control signal indicating the fluid flow is restricted to the reservoir; setting the pump control signal to full pump command, recording the flow pressure at full pump command, setting the pump control signal towards the minimum pump control signal, ramping up the pump control signal by a calibration step point and determining if the flow pressure withing a defined range of the recorded flow pressure at full pump command. The ramping up of the pump control signal by a calibration step point is iteratively repeated until the flow pressure is within a defined range of the recorded flow pressure at full pump command.

The program instructions further comprise confirming if the fluid is within an operating temperature range prior to proceeding with the calibrating.

The program instructions further comprise of confirming if the engine speed is within an operating speed range prior to proceeding with the calibrating.

In another embodiment, the program instructions for calibrating the second pump threshold in the pump-flow curve comprises of setting the valve control signal at a restriction setting, the restriction setting indicative of the fluid flow restricted to the reservoir, setting the pump control signal to full pump command, recording the flow pressure at full pump command, setting the pump control signal towards the minimum pump control signal, and ramping up the pump control signal by a calibration step point. The program instructions further include determining if the flow pressure is within a defined range of the recorded flow pressure at full pump command, and iteratively repeating the ramping of the pump control signal by a calibration step point until the flow pressure is within a defined range of the recorded flow pressure. Other features and aspects of the disclosure will become apparent by consideration of the following detailed description and accompanying drawings.

The method of calibrating an electro-hydraulically controlled pump on a work machine with an open center hydraulic system for actuating an implement coupled to the work machine include the following steps. In a first step, the method includes calibrating a first pump threshold in a pump-flow curve for the pump, wherein a minimum pump control signal to actuate the pump is extrapolated from the first pump threshold. In a next step, the method includes calibrating a second pump threshold in the pump-flow curve for the pump, wherein a maximum pump control signal to actuate the pump below a relief setpoint is extrapolated from the second pump threshold. The method then includes controlling an actuation of the implement actuator by transmitting the calibrated pump control signal to the electro-hydraulically controlled pump.

Other features and aspects of the disclosure will become apparent by consideration of the following detailed description and accompanying drawings.

BRIEF DESCRIPTION OF THE DRAWINGS

FIG. 3 depicts a high-level schematic for calibrating the pump;

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "one or more of A, B, and C" or "at least one of A, B, and C" indicates the possibilities of only A, only B, only C, or any combination of two or more of A, B, and C (e.g., A and B; B and C; A and C; or A, B, and C).

As used herein, the term "controller" is a computing device including a processor and a memory. The "controller" may be a single device or alternatively multiple devices. The controller may further refer to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The term "processor" is described and shown as a single processor. However, two or more processors can be used according to particular needs, desires, or particular implementations of the controller and the described functionality. The processor may be a component of the controller, a sub-controller for actuation, or alternatively a part of another device. Generally, the processor can execute program instructions and can manipulate data to perform the operations of the controller, including operations using algorithms, methods, functions, processes, flows, and procedures as described in the present disclosure.

Figure 1:
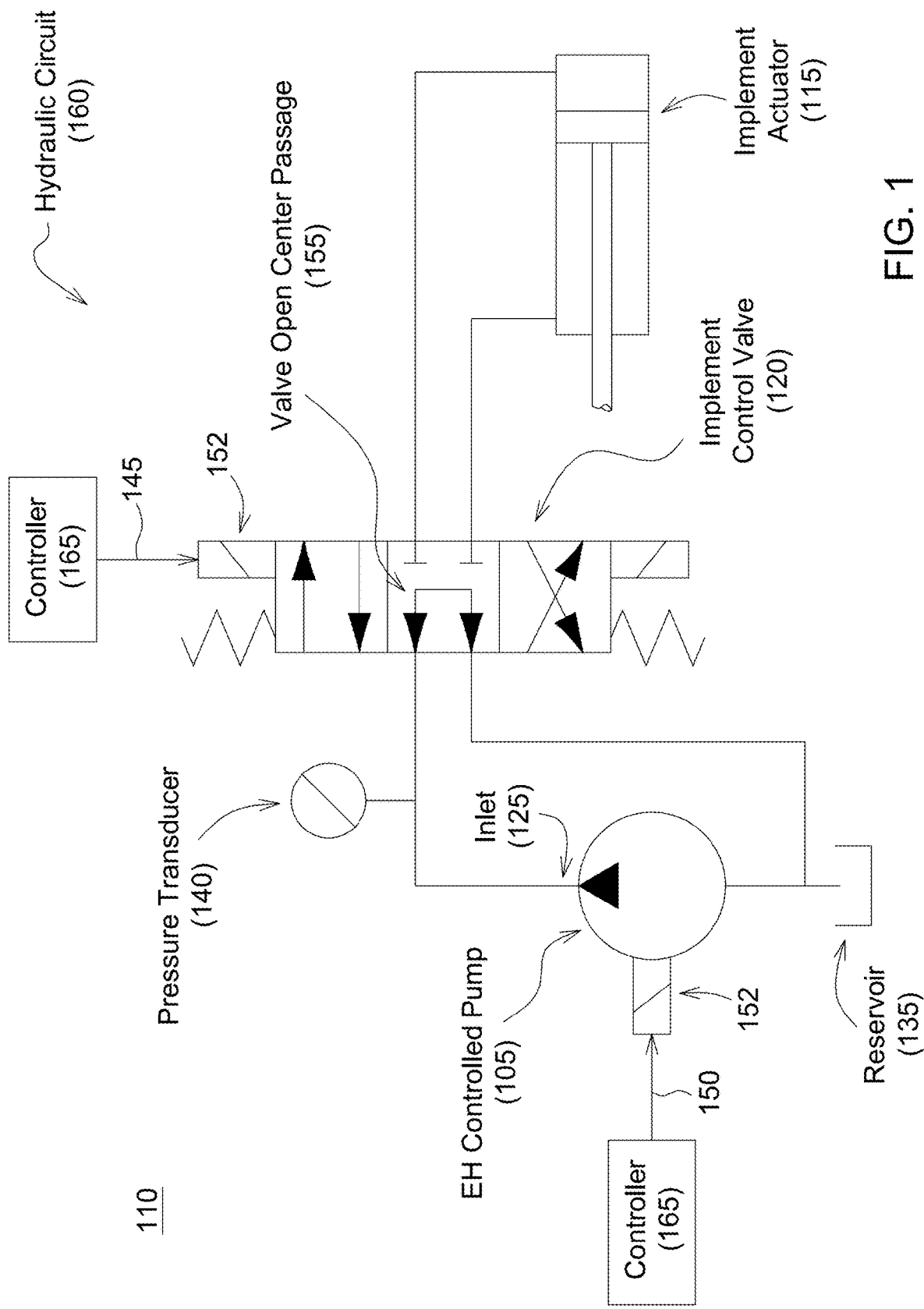
FIG. 1 depicts an embodiment of an open center hydraulic valve system diagram.
Figure 2:
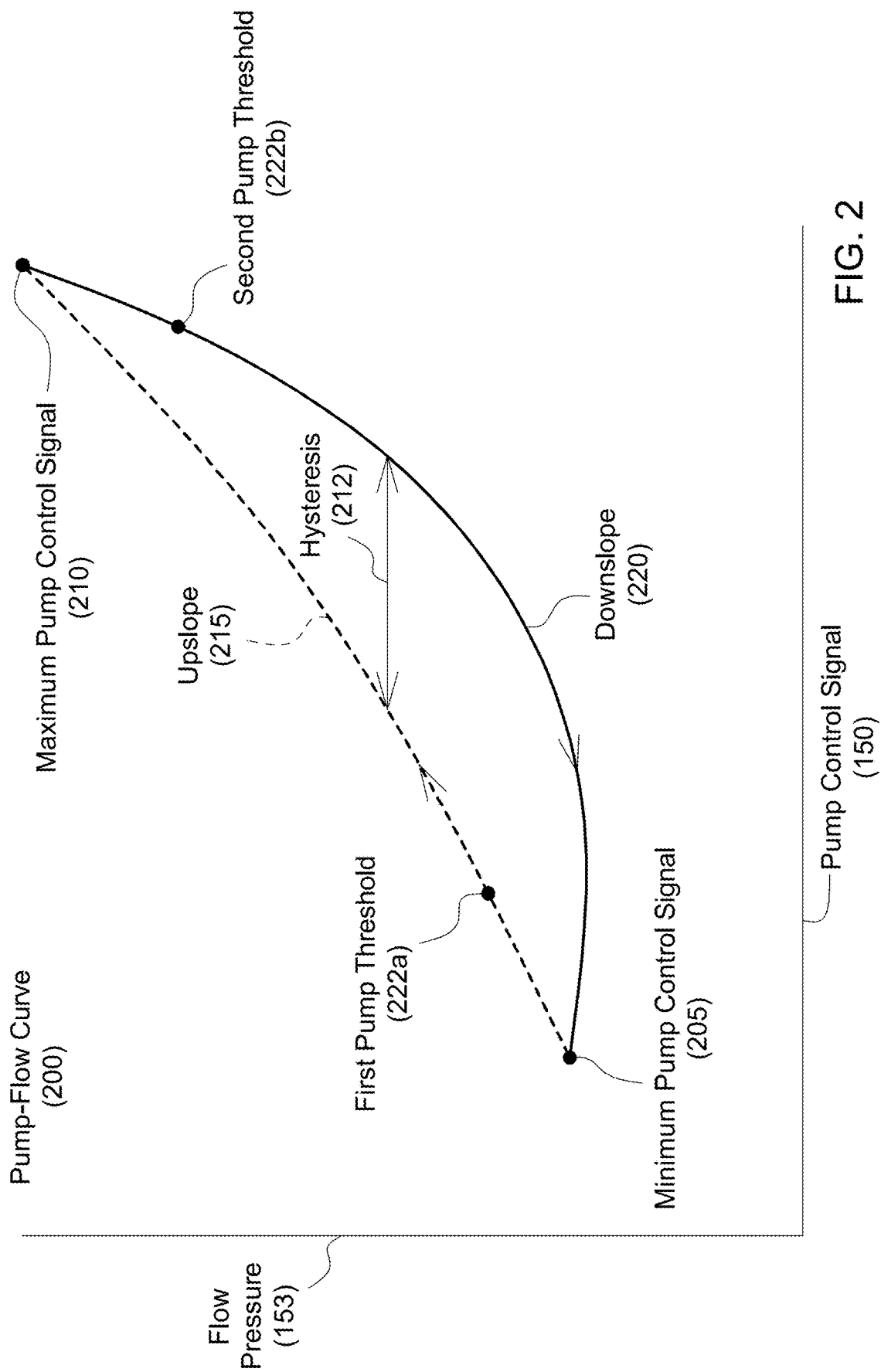
FIG. 2 depicts an embodiment of a pump-flow curve.

With references to FIGS. 1 and 2, the present disclosure is directed towards a work machine for calibrating an electro-hydraulic pump 105 with an open center hydraulic system 110 wherein the system is for controlling an implement actuator 115 coupled to the work machine. The electro-hydraulically controlled pump 105 outputs an outlet fluid flow (shown as the flow from inlet 125) through the hydraulic circuit in response to a pump control signal 150. In the embodiment shown in FIG. 1, the system 110 includes an electro-hydraulically controlled main implement control valve 120 coupled to an independent electro-hydraulically controlled pump 105. This implement control valve 120 is configured to control a flow ratio of the fluid through the hydraulic circuit between the reservoir 135 and the implement actuator 115 in response to a valve control signal 145. The implement control valve 120 in this system 110 is an "open center" type, meaning that when the valve 120 is neutralized a passage is opened to allow the flow of hydraulic fluid to pass freely between the inlet 125 and reservoir 135. In this system, the pressure in the hydraulic circuit 160 between the pump 105 and the valve 120 is measured by a pressure transducer 140. The pressure transducer 140 is positioned for measuring a flow pressure in the hydraulic circuit 160 between the pump 105 and the implement control valve 120. The pump 105 position is controlled by a hydraulic pressure piloted from an electro-hydraulic valve 152. The pressure that pilots the pump 105 is proportional to the electrical current driven to the control solenoid, hereinafter also referred to as the pump control signal 150. A minimum pump control signal 205 starts moving the pump, and a maximum pump control signal 210 achieves full actuation of the pump 105. A hysteresis band 212 may exist that dictates the difference between the "upslope" flow curve 215 (as identified by the dotted line) and the downslope flow curve 220 (as identified by the solid line). FIG. 2 correlates the pump control signal 150 to the measured pressure 153 downstream by the pressure transducer 140 wherein a precise change in flow is identifiable as a function of a change in pressure. The calibration system and method include identifying two calibration points (222a, 222b), as well as a hysteresis band 212. The two calibration points (222a, 222b) include the first pump threshold 222a for the pump in the pump-flow curve 200 wherein a minimum pump control signal 205 to actuate the pump 105 can be extrapolated from, and a second pump threshold 222b for the pump 105 in the pump-flow curve 200 wherein a maximum pump control signal 210 to actuate the pump 105 can be extrapolated from.

The center passage 155 of the open center hydraulic valve 120 is typically closed off at some rate as one of the work circuit passages 160 is opened up. The timing of this transition can vary from valve to valve. Typically, the center passage 155 is not completely closed off until the work circuit passages are at least partially opened. This ensures that there is always a path for flow, and the ratio of the orifices formed in the center passage 155 and the work circuit passage dictate the flow split. There is, however, a point in the valve spool travel range wherein the center passage 155 starts to restrict (often substantially) before the work circuit passage 160 opens up. This restriction setting can be used to create a known restrictive path to the reservoir for fluid flow in the hydraulic circuit 160, which provides a method 300 for calibrating the first pump threshold 222a and the second pump threshold 222b for the pump 105 from which the minimum pump control signal 205 and the maximum pump control signal 210 can be extrapolated from. Pump calibration establishes an area opening downstream of the pump 105. Because the area downstream remains consistent for the duration of the calibration, the precise change in fluid flow is identifiable as a function of a change in pressure 153 measured by the pressure transducer 140.

Now referencing FIG. 3 with continued reference to FIG. 2, a high-level flow diagram is schematically shown for calibrating the electro-hydraulic pump 105 in an open center hydraulic system 110. A controller 165 having a non-transitory computer readable medium with program instructions to cause a processor(s) to perform the following steps. Some conditions are required to optimize the accuracy and/or precision when calibrating. In step 305, the condition includes confirming if the engine speed is within an operating speed range prior to calibrating. Engine speed must be sufficiently set to achieve consistent pump flow relative to the pump control signal 150. This may include low-idle or a wide-open throttle based on the design of the program instructions. If a minimum engine speed condition is not met (i.e. within a normal operating range), the program instructions move to step 309 to halt the calibration routing, and continues with amending the engine speed in step 307, prior to repeating step 305. Step 306 discloses another condition that includes confirming if the fluid in the hydraulic circuit 160 is within an operating temperature range prior to calibrating. Generally, fluid outside the normal operating temperature ranges may differ in viscosity and could potentially impact the accuracy of calibration. For example, performing the calibration routine if the fluid temperature is below the normal operating temperature range may yield calibration results reflecting fluid properties different from normal operating conditions. As shown in steps 309 and 308, the program instructions will require a delay in commencing calibration until the fluid is warmed to a temperature in the normal operating temperature range. Additionally, the program instructions will not necessarily identify the exact minimum pump control signal 205, the maximum pump control signal 210, or a magnitude of the hysteresis 212 in the pump-flow curve 200. However, the program instructions identify calibration points such as the first pump threshold 222a and the second pump threshold 222b along the pump-flow curve 200 from which the minimum pump control signal 205 and the maximum pump control signal 210 can be extrapolated. Once the engine speed and temperature are within defined ranges reflecting normal operating conditions, the program instructions for calibrating move forward. In step 310, the method 300 includes calibrating a first pump threshold 222a for the pump 105 in the pump-flow curve 200. In step 320, the method 300 then calibrates a second pump threshold 222b for the pump 105 in the pump-flow curve 200. Finally in step 330, the method 300 may further include 300 determining a hysteresis band 212 in the pump-flow curve 200. Calibration of the thresholds and identifying the hysteresis may be re-ordered, or omitted, and need not necessarily follow the steps outlined. Calibration is then complete in step 340. In step 350, the work machine may then proceed with controlling an actuation of the implement actuator by transmitting the calibrated pump control signals.

Figure 4A:
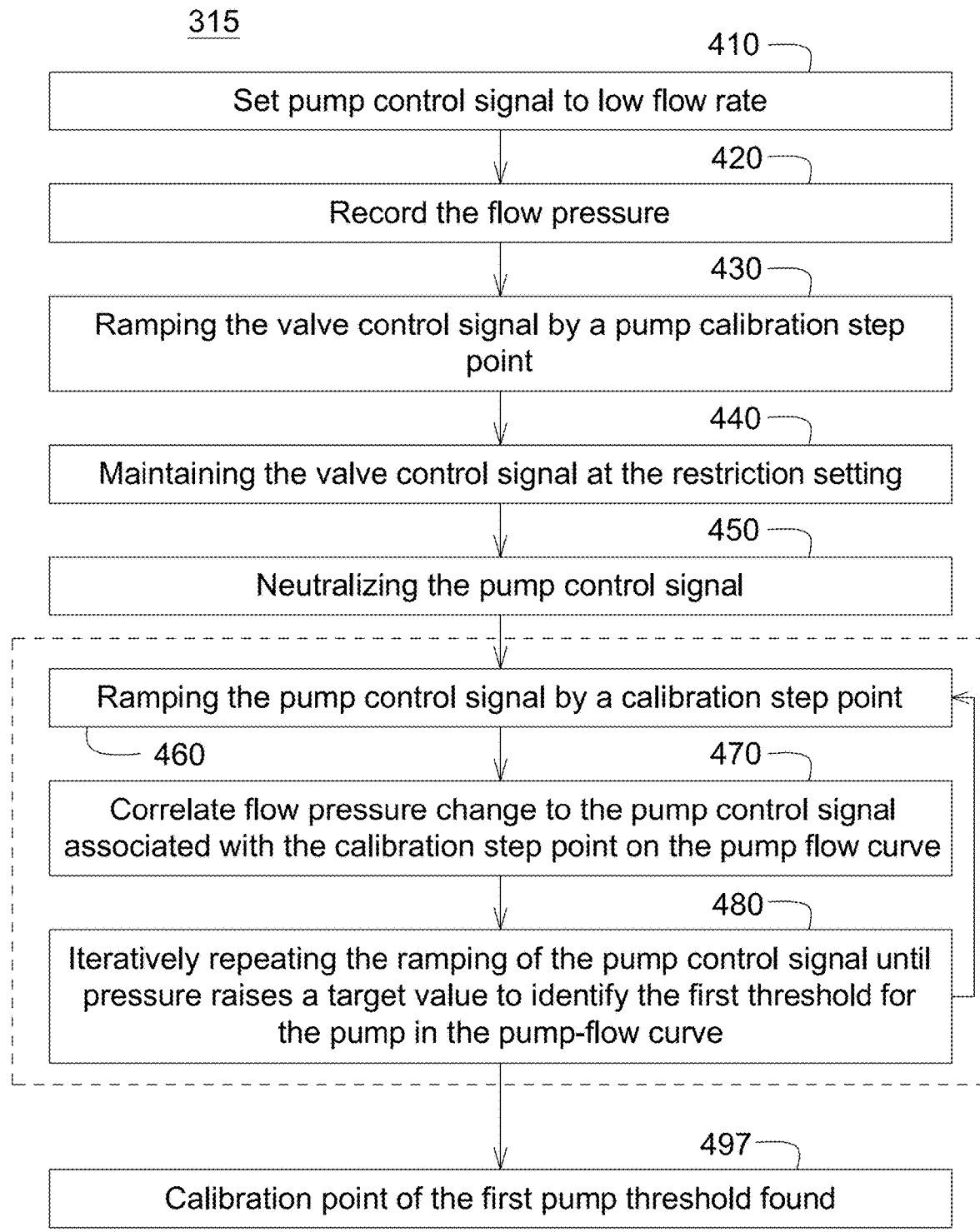
FIG. 4A depicts a schematic for calibrating the first pump threshold.
Figure 4B:
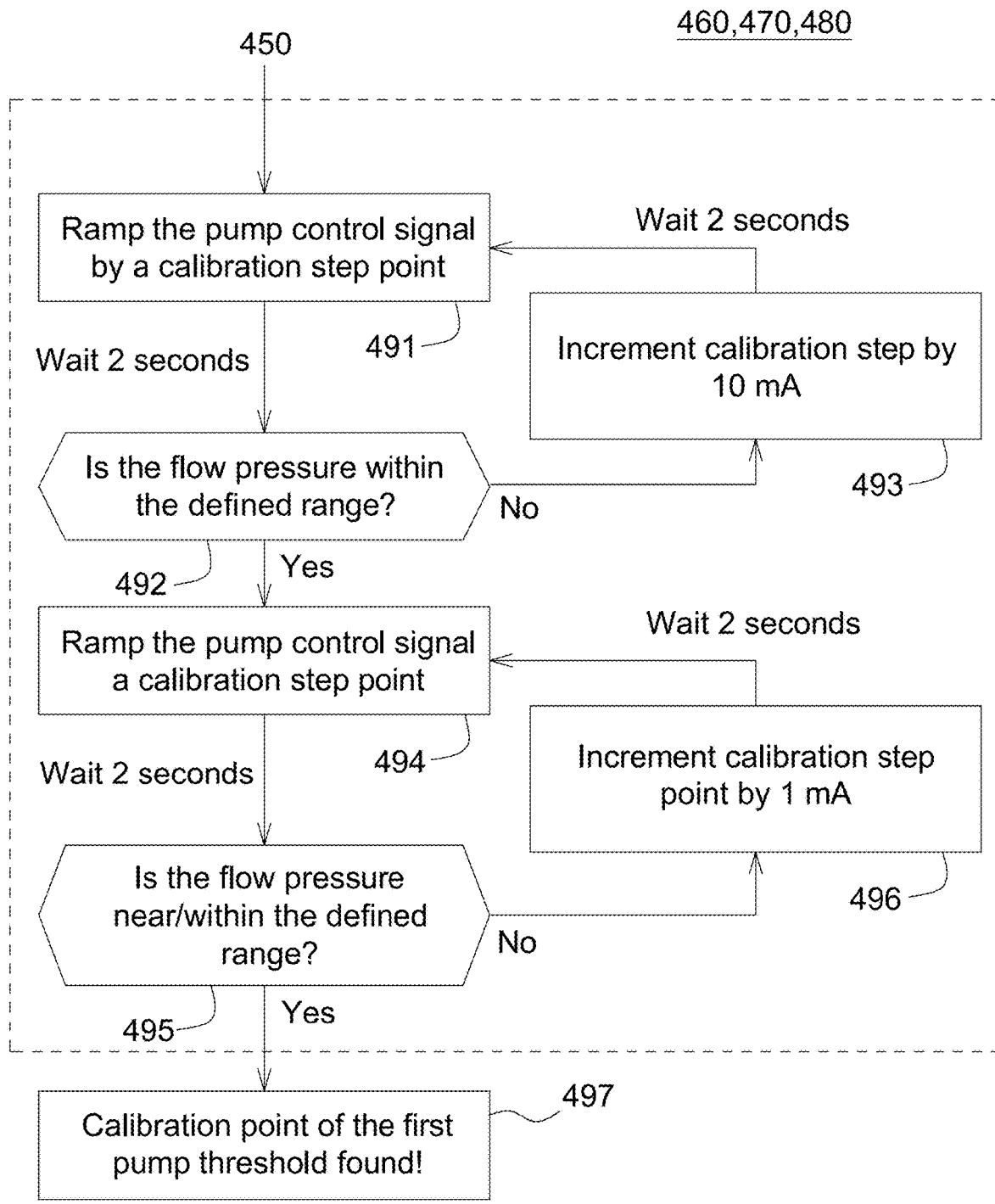
FIG. 4B is a more detailed schematic of a portion of the flow diagram for calibrating the first pump threshold.

FIGS. 4A and 4B elaborate on the program instructions for calibrating the first pump threshold 222a in step 315, wherein 4B is a detailed diagram of step 460 through step 480 in FIG. 4A. In a first step 410, the program instructions include causing a processor to set the pump control signal 150 to a low flow rate within a nominal control range. In a next step 420, the flow pressure 153 is recorded. Then in step 430 the processor incrementally ramps the valve control signal until the flow pressure 153 equals a defined value, the flow pressure at this defined value indicative of a restriction setting, that is a restricted fluid flow to the reservoir. The pressure transducer 140 will observe a sudden increase in flow pressure 153, reflecting this restriction setting. This restriction setting is used to create a known restrictive path to the reservoir for fluid flow in the hydraulic circuit 160, which provides a method 300 for calibrating the first pump threshold 222a and the second pump threshold 222b for the pump 105 from which the minimum pump control signal 205 and the maximum pump control signal 210 can be extrapolated from. Pump calibration utilizes establishes an area opening downstream of the pump 105. Because the area downstream remains consistent for the duration of the calibration, the precise change in fluid flow is identifiable as a function of a change in pressure 153 measured by the pressure transducer 140. Later on, the program instructions for calibrating the first pump threshold 222a in the pump-flow curve 200 wherein the minimum pump control signal 205 may be extrapolated from, further comprise steps 440 and 450. Steps 440 and 450 maintain the valve control signal 145 at this restriction setting, and the pump control signal 150 is neutralized at the low flow rate. In one embodiment, for example, neutral may be defined as setting the pump control signal 150 to 0 mA when neutralizing the pump control 150 at the minimum pump control signal 205.

The pressure 142 from the pressure transducer 140 is recorded upon neutralizing the pump. Once this restrictive path for the pump flow is set, the flow pressure 152 measurement (i.e. recordation) can be used to derive a correlation correlating the pump control signal 150 to a change in fluid flow as seen in step 470. The process reiterates beginning with step 460, wherein the pump control signal 150 is ramped up by a calibration step point and correlating a flow pressure to the pump control signal 150 on the pump flow curve associated with the calibration step point in step 470. The calibration step point in one embodiment may be when the flow pressure 153 changes a defined minimum value. Because the valve 155 has already established a restrictive path to the reservoir 135, any fluid flow generated by the pump 105 should generate a rise in flow pressure 153, and a known point on the pump-flow curve 200. Steps 470 includes correlating the flow pressure 153 change to a change in the pump control signal 150. In step 480, the program instructions iteratively repeat the ramping up of the pump control signal 150 until the flow pressure 153 rises a target value. A target value may be defined by the design of the open center hydraulic system. The target value must be substantial enough to ensure the changes in flow equate to measurable changes in flow pressure 153. This may be done through a first pass using "coarse increments" and subsequent passes using "fine" increments as outlined in steps 460, 470, and 480, as detailed in FIG. 4B.

Now turning to FIG. 4B, in step 491, the program instructions include ramping up the pump control signal 150 a calibration step point. If the flow pressure 153 is within a defined range as checked in step 492, the pump control signal is incremented by another calibration step point (10 mA) as shown in step 493. If the flow pressure 153 does change within a defined range, the pump control signal 150 incrementally ramps to another calibration step point in step 494. The subsequent program instructions in step 496, use a fine increment such as 1 mA, if the flow pressure 153 is not near or within the defined range as shown in step 495. If the flow pressure 153 is near or within a defined range in step 496, then the calibration point for the first pump threshold 222a is found, as seen in step 497. The target value is defined by the design of the open center hydraulic system and is a value substantial enough to ensure the changes in flow equate to measurable changes in flow pressure. Once the flow pressure rises a target value, the calibration point for the first pump threshold 222a on the pump-flow curve in FIG. 2 is found. Note the pump control signal 150 is indicative of the pump 105 rotation speed which can dictate pump outlet flow.

Figure 5A:
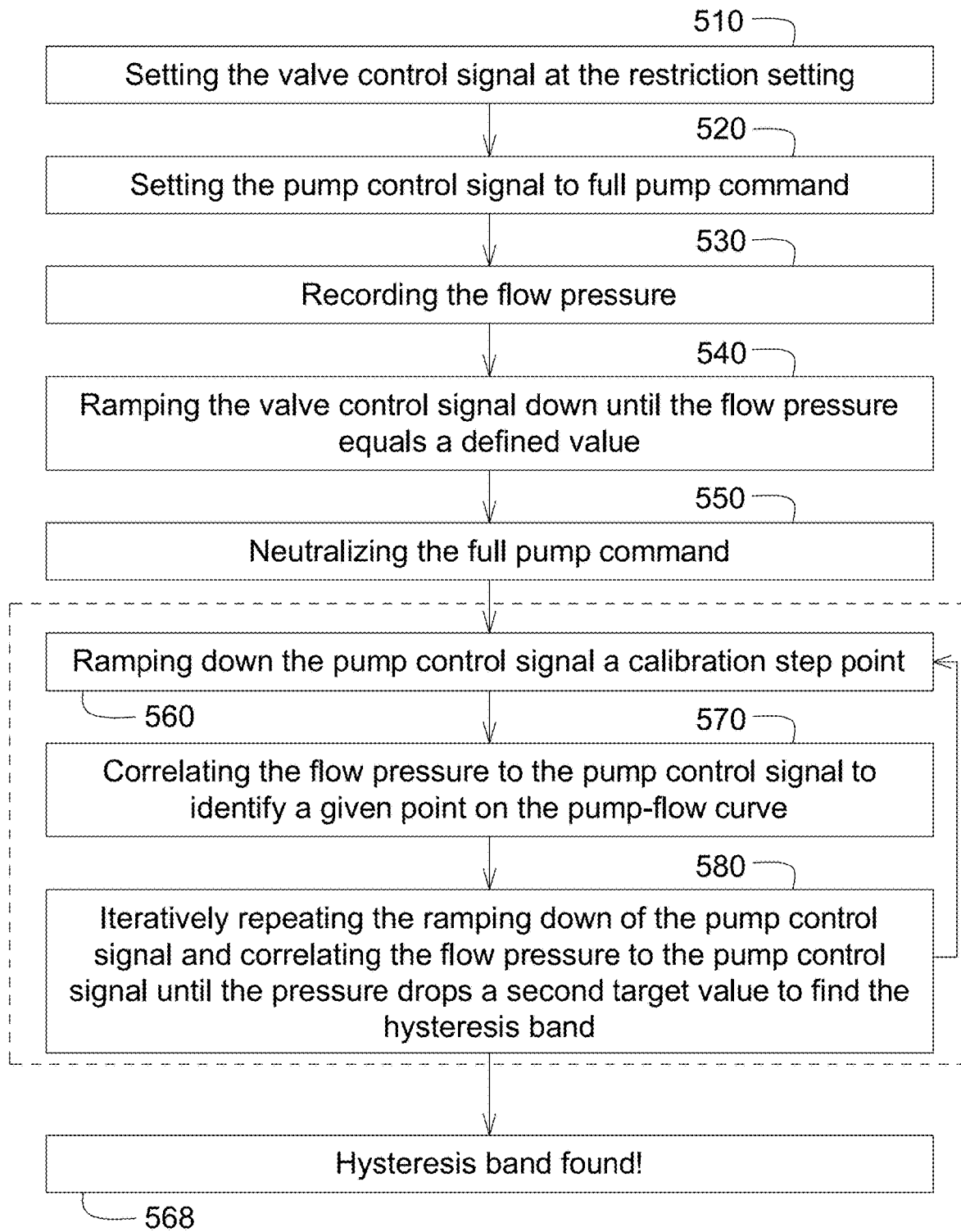
FIG. 5A depicts a schematic for calibrating the hysteresis.
Figure 5B:
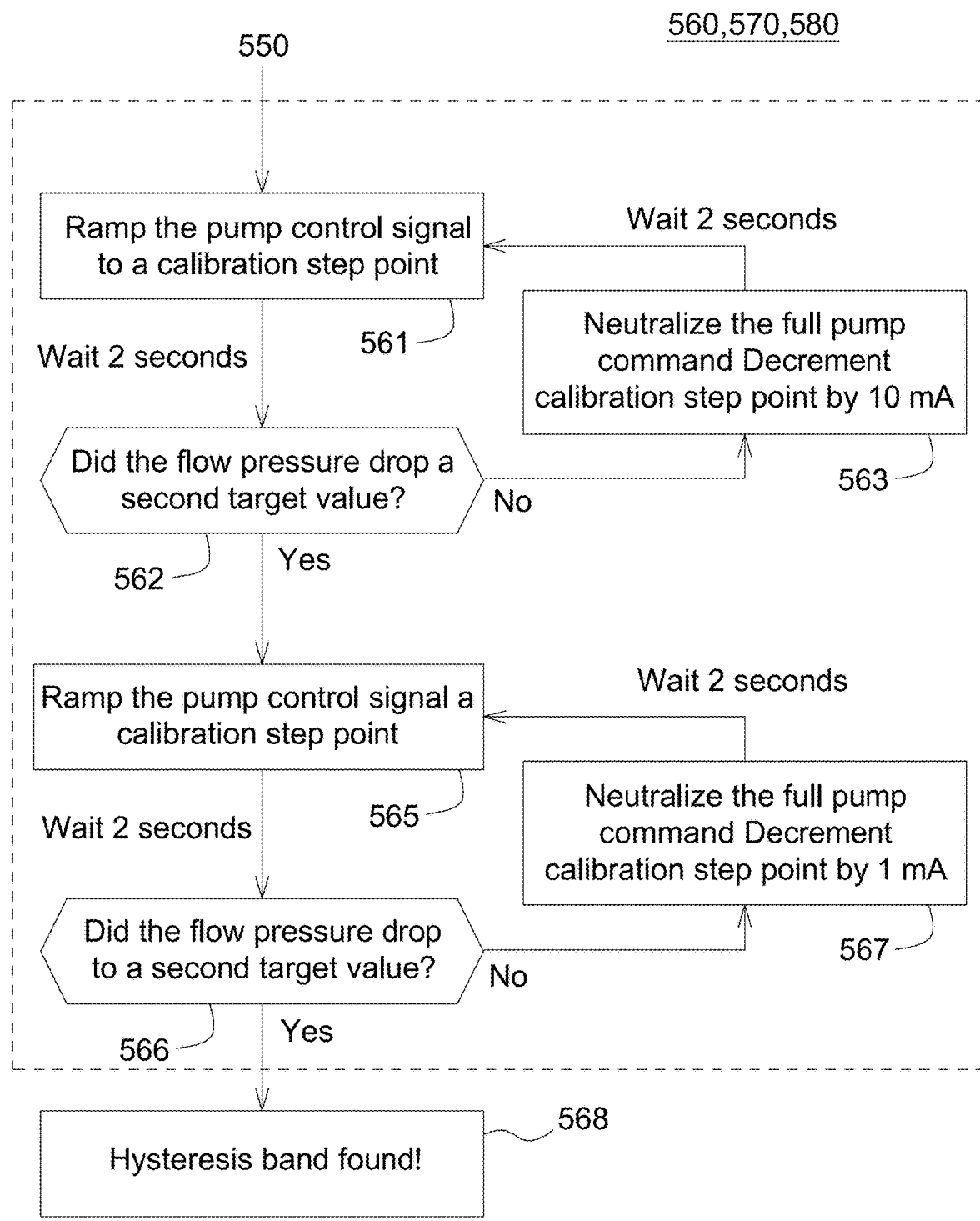
FIG. 5B is a more detailed schematic of a portion of the flow diagram for calibrating the hysteresis.

Now turning to FIGS. 5A and 5B, the hysteresis 330 can be similarly found. This hysteresis correlates closer to when the pump servo is fully actuated. In one embodiment, the program instructions would set or maintain the valve control signal 145 at the restriction setting in step 510. Next, in step 520, the pump control signal 150 is set to full pump command. This condition should generate a substantial pressure drop across the valve 155 due to the restriction setting. If the valve control signal 145 at the restriction setting creates excess flow pressure 153, a relief valve in the hydraulic circuit 160 will open. The processor than records the flow pressure in step 530. In step 540, the program instructions cause a slow ramping down of the valve control signal 145, thus gradually opening the center passage 155 until the flow pressure 153 begins to drop below a relief setpoint. In step 550, the program instructions neutralize the full pump command as the maximum pump control signal 210 when the flow pressure begins to drop below the relief setpoint. The reduction in flow pressure 153 is a proxy for a reduction in fluid flow. The observed pressure drop indicates the flow has begun to reduce and that is the hysteresis band 212 for the pump 105. In step 560, the program instructions include ramping down the pump control signal 150 a calibration step point and correlating the flow pressure 153 to the pump control signal 150 to identify a point on the pump-flow curve 200. The ramping down of the pump control signal 150 and correlating of the flow pressure 153 to the pump control signal 150 is iteratively repeated until the pressure drops a second target value and continue to map the downslope 220 of the pump-flow curve 200. Similar to the first target value, the second target value is defined by the design of the open center hydraulic system. FIG. 5B provides a granular exemplary embodiment of steps 560 through 580. Once the pump control signal 150 is ramped to a calibration step point in step 561, the program instructions assess if the flow pressure 153 drops a second target value. If it does not, the full pump command is neutralized, and the calibration step point is decreased by 10 mA in step 563. If the criteria is met, the pump control signal 150 proceeds with stepping on and off in decrements of 1 mA with "fine" adjustments (steps 564-567) until hysteresis band found in step 568.

Figure 6A:
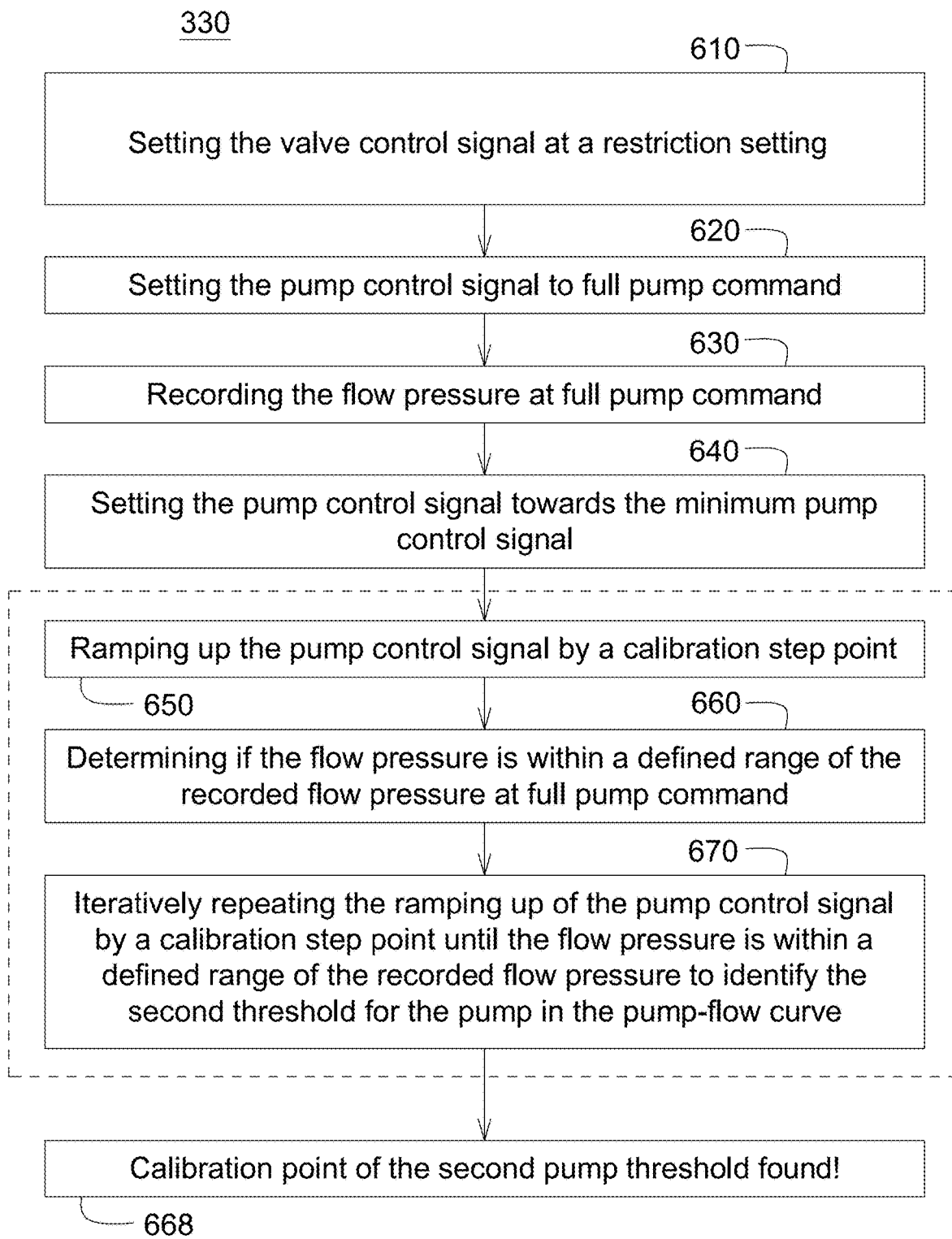
FIG. 6A depicts a schematic for calibrating the second pump threshold.
Figure 6B:
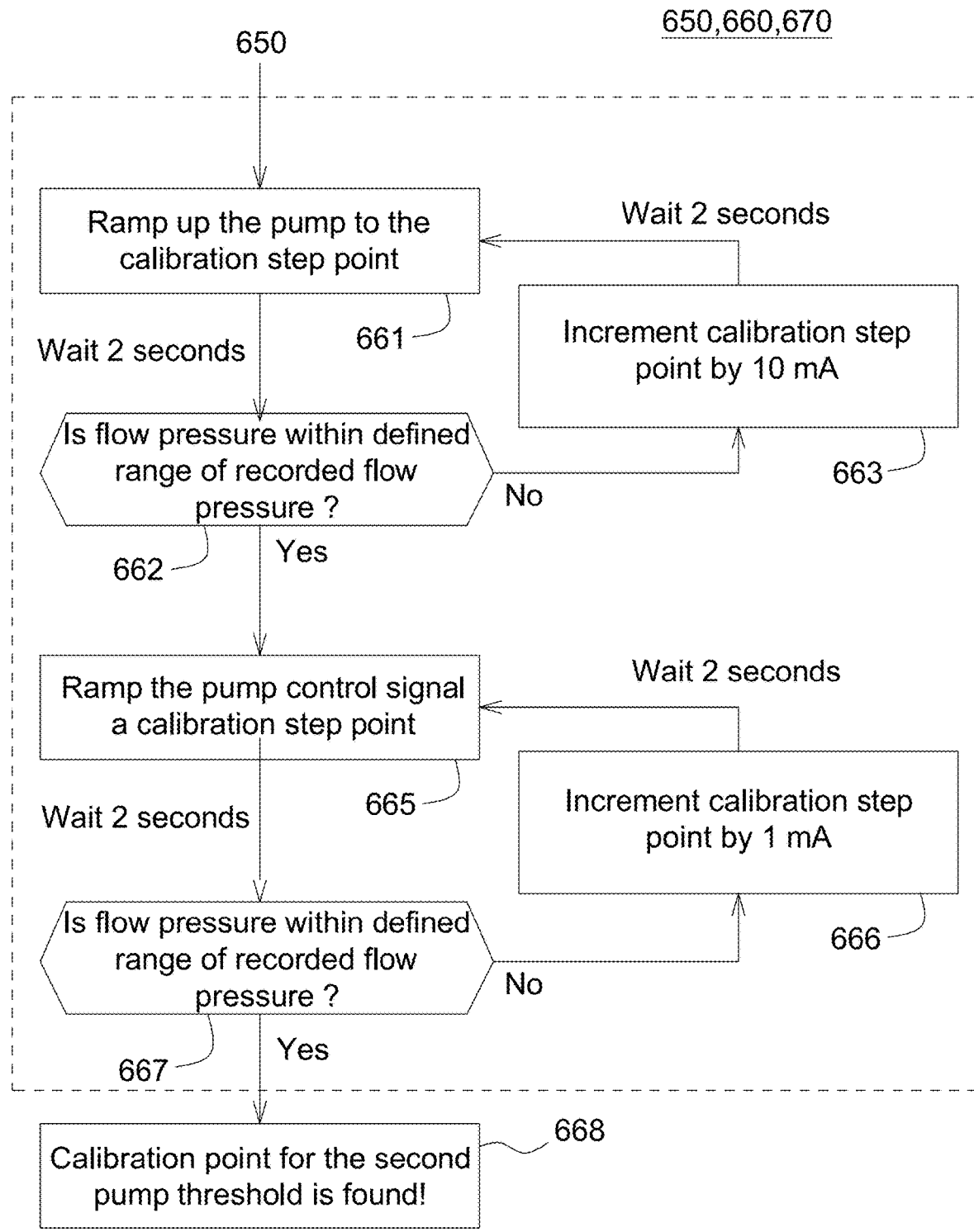
FIG. 6B is a more detailed schematic of a portion of the flow diagram for calibrating the second pump threshold.

Now turning to FIGS. 6A and 6B, the program instructions for finding a maximum pump control signal 210, from step 330 in FIG. 3, wherein the maximum pump control signal 210 may be extrapolated from a second pump threshold 222b, is shown. The program instructions for finding the calibration point of the second pump threshold 210 comprises setting the adjusted valve control signal 145 to indicate the fluid flow is restricted to the reservoir 135 in step 610 (i.e. the restrictions setting). In step 620, the program instructions include setting the pump control signal 150 to full pump command. In step 630, the program instructions include recording the flow pressure 153. Next in step 640, the program instructions include setting the pump control signal towards the minimum pump control signal 205 and ramping down the pump control signal 150 by a calibration step point in step 650. In step 660, the program instructions then determine if the flow pressure 153 is within a defined range of the recorded flow pressure 153 at full pump command from step 630. In step 670, the program instructions then iteratively repeat the ramping up of the pump control signal by a calibration step point until the flow pressure 153 is within a defined range of the recorded flow pressure at full pump command. Now turning to FIG. 6B, and similar to the first pump threshold 222a, the program instructions tune through "coarse" increments and "fine" increments. In step 661, the program instructions include ramping up the pump control signal 150 a calibrations step point. If the flow pressure 153 does not change within a defined range as checked in step 662, the pump control signal is incremented by another calibration step point (10 mA) as shown in step 663. If the flow pressure 153 is within a defined range, the pump control signal 150 incrementally ramps up another calibration step point in step 664. The subsequent program instructions in step 666, use a fine increment, such as 1 mA, if the flow pressure 153 is not near or within the defined range of the previously recorded flow pressure in step 630. If the flow pressure 153 is near or within the defined range in step 667, then the calibration point for the second pump threshold 222b is found as shown in step 668.

Figure 7:
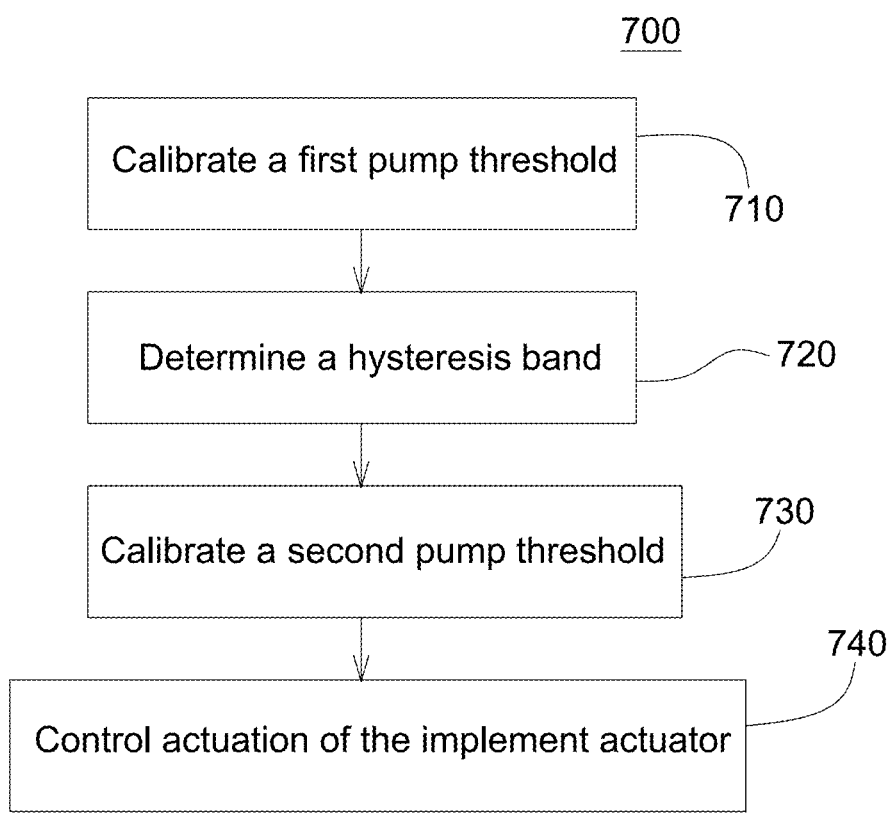
FIG. 7 is a method of calibrating a electro-hydraulic pump in an open-center hydraulic system.

Now turning to FIG. 7, a method 700 of calibrating an electro-hydraulically controlled pump 105 on a work machine with an open center hydraulic system 110 is shown.

The system 110 is for actuating an implement (i.e. via implement actuator 115) coupled to the work machine. The open center hydraulic system 110 includes an implement control valve 120 configured to control a flow ratio of a fluid through a hydraulic circuit 160 between a reservoir 135 and an implement actuator 115 in response to a valve control signal 145. The system also comprises of a pump 105 for controlling the outlet flow of the fluid through the hydraulic circuit 160 in response to a pump control signal 150; a pressure transducer 140 positioned for measuring a flow pressure 153 in the hydraulic circuit 160 between the pump and the implement control valve 120.

In a first step 710, the method includes calibrating a first pump threshold 222a in a pump-flow curve 200 for the pump 105, wherein a minimum pump control signal 205 to actuate the pump 105 can be extrapolated from the first pump threshold 222a. Then in step 720, the method 700 may include determining a hysteresis band 212 in the pump flow curve 200. In a next step 730, the method 700 includes calibrating a second pump threshold 222b in the pump-flow curve 200 for the pump 105, wherein a maximum pump control signal 210 to actuate the pump 105 below a relief setpoint it extrapolated from the second pump threshold 222b. Finally, in step 740, the method 700 includes controlling an actuation of the implement actuator 115 by transmitting the calibrated pump control signals (222a, 222b) to the electro-hydraulically controlled pump 105.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A work machine with an open center hydraulic system for actuating an implement coupled to the work machine, the work machine comprising:
   a hydraulic circuit;
     an implement control valve configured to control a flow ratio of a fluid through the hydraulic circuit between a reservoir and an implement actuator in response to a valve control signal;
     an electro-hydraulically controlled pump for controlling an outlet flow of the fluid through the hydraulic circuit in response to a pump control signal, the hydraulic circuit coupled to the implement actuator, and
     a pressure transducer positioned for measuring a flow pressure in the hydraulic circuit between the pump and the implement control valve; and
     a calibration system for calibrating the pump for controlling the outlet flow of the fluid through the open center hydraulic system, the calibration system including a controller having a non-transitory computer readable medium having a program instruction for causing a processor to:
       calibrate a first pump threshold for the pump in a pump-flow curve, wherein a minimum pump control signal to actuate the pump is extrapolated from the first pump threshold;
       calibrate a second pump threshold for the pump in the pump-flow curve, wherein a maximum pump control signal to actuate the pump below a relief setpoint is extrapolated from the second pump threshold; and
       control an actuation of the implement actuator by transmitting a calibrated pump control signal to the electro-hydraulically controlled pump.

2. The work machine of claim 1, wherein the program instructions for calibrating the first pump threshold in the pump-flow curve comprises:
   setting the pump control signal to a low flow rate;
   recording the flow pressure;
   ramping the valve control signal until the flow pressure equals a defined value, the defined value indicative of a restriction setting that is a restricted fluid flow to the reservoir;
   maintaining the valve control signal at the restriction setting;
   neutralizing the pump control signal;
   ramping up the pump control signal by a pump calibration step point;
   correlating a flow pressure change to the pump control signal to identify a point on the pump-flow curve; and
   iteratively repeating the ramping up of the pump control signal until the flow pressure rises to a target value.

3. The work machine of claim 2, wherein the program instructions further comprise:
   determining a hysteresis band in the pump-flow curve, the program instructions for determining the hysteresis band including:
   setting the valve control signal at the restriction setting;
   setting the pump control signal to a full pump command;
   recording the flow pressure;
   ramping the valve control signal down until the flow pressure equals a defined value indicative of a relief setpoint;
   neutralizing the pump control signal at the relief setpoint as the full pump command;
   ramping down the pump control signal by a calibration step point;
   correlating the flow pressure to the pump control signal to identify a point on the pump-flow curve; and
   iteratively repeating the ramping down of the pump control signal and correlating the flow pressure to the pump control signal until the flow pressure drops to a second target value.

4. The work machine of claim 3, wherein the program instructions for calibrating the second pump threshold in the pump-flow curve comprises:
   setting the valve control signal to the restriction setting;
   setting the pump control signal to the full pump command;
   recording the flow pressure at the full pump command;
   setting the pump control signal at the minimum pump control signal;
   ramping up the pump control signal by the calibration step point;
   determining if the flow pressure is within a defined range of the recorded flow pressure at the full pump command; and
   iteratively repeating the ramping up of the pump control signal by the calibration step point until the flow pressure is within the defined range of the recorded flow pressure at the full pump command.

5. The work machine of claim 1, wherein the program instructions further comprise:
   confirming if a fluid temperature is within an operating temperature range prior to calibrating.

6. The work machine of claim 1, wherein the program instructions further comprise:
confirming if an engine speed is within an operating speed range prior to calibrating.

7. The work machine of claim 1, wherein the program instructions for calibrating the second pump threshold in the pump-flow curve comprises:
setting the valve control signal at a restriction setting, the restriction setting indicative of a fluid flow is restricted to the reservoir;
setting the pump control signal to a full pump command;
recording the flow pressure at the full pump command;
setting the pump control signal at the minimum pump control signal;
ramping up the pump control signal by a calibration step point;
determining if the flow pressure is within a defined range of the recorded flow pressure at the full pump command; and
iteratively repeating the ramping up of the pump control signal by the calibration step point until the flow pressure is within the defined range of the recorded flow pressure at the full pump command.

8. A computer readable medium for calibrating an electro-hydraulically controlled pump on a work machine with an open center hydraulic system for actuating an implement coupled to the work machine, the open center hydraulic system including an implement control valve configured to control a flow ratio of a fluid through a hydraulic circuit between a reservoir and an implement actuator in response to a valve control signal, the pump for controlling an outlet flow of the fluid through the hydraulic circuit in response to a pump control signal, a pressure transducer positioned for measuring a flow pressure in the hydraulic circuit between the pump and the implement control valve, the computer readable medium comprising a program instruction for causing a processor of a controller to:
calibrate a first pump threshold for the pump in a pump-flow curve, wherein a minimum pump control signal to actuate the pump is extrapolated from the first pump threshold;
calibrate a second pump threshold for the pump in the pump-flow curve, wherein a maximum pump control signal to actuate the pump below a relief setpoint is extrapolated from the second pump threshold;
control an actuation of the implement actuator by transmitting a calibrated pump control signal to the electro-hydraulically controlled pump.

9. The computer readable medium of claim 8, wherein the program instructions for calibrating the first pump threshold in the pump-flow curve comprises:
setting the pump control signal to a low flow rate;
recording the flow pressure;
ramping the pump control signal incrementally;
correlating a flow pressure change to the pump control signal to identify a point on the pump-flow curve; and
iteratively repeating the ramping of the pump control signal until the flow pressure rises to a target value.

10. The computer readable medium of claim 9, wherein the program instructions further comprise:
determining a hysteresis band in the pump-flow curve, the program instructions for determining the hysteresis band including:
setting the valve control signal at a restriction setting;
setting the pump control signal to a full pump command;
recording the flow pressure;
ramping the valve control signal down until the flow pressure equals a defined value indicative of a relief setpoint;
neutralizing the pump control signal as the full pump command at the relief setpoint;
ramping the pump control signal down incrementally;
correlating the flow pressure to the pump control signal to identify a point on the pump-flow curve; and
iteratively repeating a ramping down of the pump control signal until the adjustment amount falls within a defined range of a second target value.

11. The computer readable medium of claim 10, wherein the program instructions for calibrating the second pump threshold in the pump-flow curve comprises:
setting the valve control signal to the restriction setting;
setting the pump control signal to the full pump command;
recording the flow pressure at the full pump command;
setting the pump control signal at the minimum pump control signal;
ramping up the pump control signal incrementally;
determining if the flow pressure is within a defined range of the recorded flow pressure at the full pump command; and
iteratively repeating the ramping up of the pump control signal incrementally until the flow pressure is within the defined range of the recorded flow pressure at the full pump command.

12. The computer readable medium of claim 8, wherein the program instruction further comprises:
confirming a fluid temperature is within an operating temperature range prior to calibrating.

13. The computer readable medium of claim 8, wherein the program instruction further comprises:
confirming an engine speed is within an operating speed range prior to calibrating.

14. The computer readable medium of claim 8, wherein the program instructions for calibrating the second pump threshold in the pump-flow curve comprises:
setting the valve control signal at a restriction setting, the restriction setting indicative of a fluid flow is restricted to the reservoir;
setting the pump control signal to a full pump command;
recording the flow pressure at the full pump command;
setting the pump control signal at the minimum pump control signal;
ramping up the pump control signal by a calibration step point;
determining if the flow pressure is within a defined range of the recorded flow pressure at the full pump command; and
iteratively repeating the ramping of the pump control signal by the calibration step point until the flow pressure is within the defined range of the recorded flow pressure at the full pump command.

15. A method of calibrating an electro-hydraulically controlled pump on a work machine with an open center hydraulic system for actuating an implement coupled to the work machine, the open center hydraulic system including an implement control valve configured to control a flow ratio of a fluid through a hydraulic circuit between a reservoir and an implement actuator in response to a valve control signal, the pump for controlling an outlet flow of the fluid through the hydraulic circuit in response to a pump control signal, a pressure transducer positioned for measuring a flow pressure in the hydraulic circuit between the pump and the implement control valve, the method comprising:
- calibrating a first pump threshold in a pump-flow curve for the pump, wherein a minimum pump control signal to actuate the pump is extrapolated from the first pump threshold;
- calibrating a second pump threshold in the pump-flow curve for the pump, wherein a maximum pump control signal to actuate the pump below a relief setpoint is extrapolated from the second pump threshold; and
- controlling an actuation of the implement actuator by transmitting a calibrated pump control signal to the electro-hydraulically controlled pump.

16. The method of claim 15, wherein calibrating the first pump threshold in the pump-flow curve comprises:
- setting the pump control signal to a low flow rate;
- recording the flow pressure;
- ramping the valve control signal incrementally until the flow pressure equals a defined value, the defined value indicative of a restriction setting, that is a restricted fluid flow-to the reservoir;
- maintaining the valve control signal at the restriction setting;
- neutralizing the pump control signal;
- ramping up the pump control signal incrementally;
- correlating a flow pressure change to the pump control signal to identify a point on the pump-flow curve; and
- iteratively repeating the ramping up of the pump control signal until the flow pressure rises a target value.

17. The method of claim 16 further comprises determining a hysteresis band in the pump-flow curve, wherein determining the hysteresis band includes:
- setting the valve control signal at the restriction setting;
- setting the pump control signal to a full pump command;
- recording the flow pressure;
- ramping the valve control signal down until the flow pressure equals a defined value;
- neutralizing the pump control signal at the relief setpoint as the full pump command;
- ramping down the pump control signal incrementally;
- correlating the flow pressure change to the pump control signal to identify a point on the pump-flow curve; and
- iteratively repeating the ramping down of the pump control signal and correlating the flow pressure to the pump control signal until the flow pressure drops to a second target value.

18. The method of claim 15, further comprising:
- confirming if a fluid temperature is within an operating temperature range prior to calibrating.

19. The method of claim 15, further comprising:
- confirming if an engine speed of the work machine is within an operating speed range prior to calibrating.

20. The method of claim 15, wherein calibrating the second pump threshold in the pump-flow comprises:
- setting the valve control signal at a restriction setting, the restriction setting indicative of a fluid flow is restricted to the reservoir;
- setting the pump control signal to a full pump command;
- recording the flow pressure at the full pump command;
- setting the pump control signal at the minimum pump control signal;
- ramping up the pump control signal incrementally;
- determining if the flow pressure is within a defined range of the recorded flow pressure at the full pump command; and
  - iteratively repeating the ramping up of the pump control signal until the flow pressure is within the defined range of the recorded flow pressure at the full pump command.

* * * * *